US012597836B2

(12) United States Patent
Wang et al.

(10) Patent No.: US 12,597,836 B2
(45) Date of Patent: Apr. 7, 2026

(54) INDUCTION ROTOR ASSEMBLY WITH THIN FOILS

(71) Applicant: GM Global Technology Operations LLC, Detroit, MI (US)

(72) Inventors: Qigui Wang, Rochester Hills, MI (US); Yi Liu, Troy, MI (US); Liang Wang, Rochester Hills, MI (US); Lei Hao, Troy, MI (US); Steven L. Burkholder, Archbold, OH (US); Jason J. Coryell, Rochester Hills, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 190 days.

(21) Appl. No.: 18/441,202

(22) Filed: Feb. 14, 2024

(65) Prior Publication Data

US 2025/0260298 A1 Aug. 14, 2025

(51) Int. Cl.
*H02K 17/16* (2006.01)
*H02K 15/023* (2025.01)

(52) U.S. Cl.
CPC ......... *H02K 17/168* (2023.05); *H02K 15/023* (2025.01)

(58) Field of Classification Search
CPC ........ H02K 17/20; H02K 15/023; H02K 3/02; H02K 17/168; H02K 17/16; H02K 17/18
USPC ........................................................ 310/211
See application file for complete search history.

(56) References Cited

U.S. PATENT DOCUMENTS

| | | | | |
|---|---|---|---|---|
| 3,130,335 A | * | 4/1964 | Rejda | H02K 3/345 |
| | | | | 174/DIG. 20 |
| 4,988,550 A | * | 1/1991 | Keyser | B32B 7/06 |
| | | | | 428/173 |
| 7,019,428 B2 | * | 3/2006 | Sato | H02K 17/168 |
| | | | | 310/211 |
| 2007/0252444 A1 | * | 11/2007 | Sadakane | H02K 41/031 |
| | | | | 310/12.21 |
| 2012/0126656 A1 | * | 5/2012 | Gerard | H02K 15/023 |
| | | | | 29/598 |
| 2020/0304001 A1 | * | 9/2020 | Tsuboi | H02K 5/1732 |

FOREIGN PATENT DOCUMENTS

| | | | | | |
|---|---|---|---|---|---|
| CN | 113950408 B | * | 1/2023 | | B32B 37/06 |
| DE | 10247484 A1 | | 4/2004 | | |

OTHER PUBLICATIONS

English Translation of CN113950408B (Year: 2023).*

* cited by examiner

*Primary Examiner* — Terrance L Kenerly
*Assistant Examiner* — Theodore L Perkins
(74) *Attorney, Agent, or Firm* — Vivacqua Crane, PLLC

(57) ABSTRACT

An induction rotor assembly is provided. The induction rotor assembly includes a laminated stack, a plurality of foils, a plurality of conductor bars, a first end ring, and a second end ring. The laminated stack includes a body with an outer circumferential surface with a plurality of grooves extending from the first end to the second end. Each one of the plurality of foils is disposed within one of the grooves. Each of the foils is disposed between each of the conductor bars and each of the grooves. Each of the plurality of conductor bars includes a first conductor end and a second conductor end. The first end ring mates with a surface of each first conductor end. The second end ring mates with a surface of each second conductor end, and the plurality of conductor bars extends between the first end ring and the second end ring.

20 Claims, 4 Drawing Sheets

INDUCTION ROTOR ASSEMBLY WITH THIN FOILS

INTRODUCTION

The present disclosure relates to induction rotor assemblies and more particularly systems and methods of making cast induction rotor assemblies having conductive bars with thin foils.

An induction electric motor generally includes a stator and a rotor. The stator is generally stationary, while the rotor rotates and includes a series of conductor bars arranged in a circular pattern around a body of the rotor. When an electric current is applied to the stator, a magnetic field is created that interacts with the rotor and the conductor bars. This interaction causes the rotor to rotate, which in turn produces mechanical energy.

Many current traction motors, especially in electric vehicles, use bar winding to improve a fill factor of the stator. However, the bar winding can lead to a high skin effect or a tendency of an alternating electric current to become distributed within each conductor bar such that current density is largest near the conductor bar surface while decreasing exponentially with greater depths in each conductor bar. This high skin effect results in undesirable resistance, significantly increases loss, and limits motor power density, speed, and torque capability.

While current induction rotor assemblies achieve their intended purpose, there is a need for a system and method of making an induction rotor having conductor bars with improved electrical conductivity within the conductor.

SUMMARY

According to several aspects of the present disclosure, an induction rotor assembly is provided. The induction rotor assembly includes a laminated stack, a plurality of foils, a plurality of conductor bars, a first end ring, and a second end ring. The laminated stack includes a body having a first end and an opposing second end arranged along a longitudinal axis. The body has an outer circumferential surface extending from the first end to the second end along the longitudinal axis, and the outer circumferential surface has a plurality of grooves extending from the first end to the second end. Each one of the plurality of foils is disposed within one of the grooves. Each of the plurality of conductor bars is disposed within each of the grooves, and each one of the plurality of foils is disposed between each one of the plurality of conductor bars and each one of the grooves. Each of the plurality of conductor bars includes a first conductor end extending axially beyond the first end of the laminated stack and a second conductor end extending axially beyond the second end of the laminated stack. The first end ring mates with a surface of each first conductor end to interlock each of the plurality of conductor bars to the first end ring. The second end ring mates with a surface of each second conductor end to interlock each of the plurality of conductor bars to the second end ring, and the plurality of conductor bars extends between the first end ring and the second end ring.

In accordance with another aspect of the disclosure, the induction rotor assembly has a body including a plurality of laminated steel sheets.

In accordance with another aspect of the disclosure, the induction rotor assembly has a plurality of foils that is pure copper or copper graphene composite.

In accordance with another aspect of the disclosure, the induction rotor assembly has a plurality of foils that is less than or equal to 20% graphene by volume.

In accordance with another aspect of the disclosure, the induction rotor assembly has a plurality of foils including an adhesive on one side of each foil.

In accordance with another aspect of the disclosure, the induction rotor assembly has a plurality of foils with each foil between 20 and 30 micrometers thick.

In accordance with another aspect of the disclosure, the induction rotor assembly has a plurality of foils with each foil protruding from the grooves.

In accordance with another aspect of the disclosure, the induction rotor assembly has a plurality of foils with each foil including a coating at least partially having a rough surface.

In accordance with another aspect of the disclosure, the induction rotor assembly has multiple foil layers disposed between each groove and each conductor bar.

In accordance with another aspect of the disclosure, the induction rotor assembly has a plurality of conductor bars formed from at least one of copper or aluminum.

In accordance with another aspect of the disclosure, the induction rotor assembly includes a first end ring and a second end ring each cast in place over the first conductor end and the second conductor end, respectively, of each of the plurality of conductor bars.

In accordance with another aspect of the disclosure, the induction rotor assembly has a first end ring and a second end ring formed from aluminum.

According to several aspects of the present disclosure, a vehicle motor is provided. The vehicle motor includes a stator and an induction rotor assembly. The induction rotor assembly is configured to rotate due to a rotating magnetic field created by the stator. The induction rotor assembly includes a laminated stack, a plurality of foils, a plurality of conductor bars, a first end ring, and a second end ring. The laminated stack includes a body having a first end and an opposing second end arranged along a longitudinal axis. The body has an outer circumferential surface extending from the first end to the second end along the longitudinal axis, and the outer circumferential surface has a plurality of grooves extending from the first end to the second end. Each plurality of foils is disposed within one of the grooves. Each of the plurality of conductor bars is disposed within each of the grooves, and each one of the plurality of foils is disposed between each one of the plurality of conductor bars and each one of the grooves. Each of the plurality of conductor bars includes a first conductor end extending axially beyond the first end of the laminated stack and a second conductor end extending axially beyond the second end of the laminated stack. The first end ring mates with a surface of each first conductor end to interlock each of the plurality of conductor bars to the first end ring. The second end ring mates with a surface of each second conductor end to interlock each of the plurality of conductor bars to the second end ring, and the plurality of conductor bars extends between the first end ring and the second end ring.

In accordance with another aspect of the disclosure, the vehicle motor includes a plurality of foils of pure copper or copper-graphene composite.

In accordance with another aspect of the disclosure, the vehicle motor includes a plurality of foils, and each foil of the plurality of foils is between 20 and 30 micrometers thick.

In accordance with another aspect of the disclosure, the vehicle motor includes a plurality of conductor bars formed from at least one of copper or aluminum.

According to several aspects of the present disclosure, a method is provided. The method includes laminating a plurality of steel sheets to form a laminated stack having a first end and an opposing second end axially spaced along a longitudinal axis. A plurality of grooves are disposed on an outer circumferential surface of the laminated stack and extend from the first end to the second end. The method includes placing a plurality of foils in the plurality of grooves. The method includes forming a conductor bar in each of the grooves such that each one of the plurality of foils is disposed between each conductor bar and the laminated stack. A first conductor end extends axially beyond the first end of the laminated stack. The method also includes casting a first end ring in place around each first conductor end of each of the conductor bars and a second end ring in place around each second conductor end of each of the conductor bars to at least partially surround and electrically connect the first conductor end and the second conductor end of each of the plurality of conductor bars.

In accordance with another aspect of the disclosure, the method includes a plurality of foils including pure copper or copper-graphene composite.

In accordance with another aspect of the disclosure, the method includes placing preformed foils when placing the plurality of foils in the plurality of grooves.

In accordance with another aspect of the disclosure, the method includes placing the foils in situ when placing the plurality of foils in the plurality of grooves.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
FIG. 1 is a perspective view illustrating a vehicle having an electric motor with an induction rotor assembly, in accordance with the present disclosure.

Referring to FIG. 1, a vehicle 10 having a vehicle motor 12 or inverter is shown, according to the principles of the present disclosure. The vehicle motor 12 provides motive power to the vehicle 10 and receives electrical power from at least one battery (not shown). The vehicle motor 12 is illustrated with an exemplary vehicle 10, and the vehicle 10 is an electric vehicle or hybrid vehicle having wheels 14 driven by the vehicle motor 12. The vehicle motor 12 includes an induction electric motor. While the vehicle 10 is illustrated as a passenger road vehicle, it should be appreciated that the vehicle motor 12 may be used with various other types of vehicles. For example, the vehicle motor 12 may be used in nautical vehicles, for example boats, or aeronautical vehicles, for example drones or passenger airplanes. Moreover, the vehicle motor 12 may be used as a stationary power source separate and independent from a vehicle.

FIG. 1 depicts a cut away view of the vehicle motor 12 illustrating a stator 16 and an induction rotor assembly 18. The stator 16 is a stationary portion of a rotary system within the vehicle motor 12 and is generally formed from steel. Electricity is provided to the stator 16 and is converted to a rotating magnetic field. The induction rotor assembly 18 rotates due to the rotating magnetic field and provides torque to the vehicle 10 for motive power.

Figure 2:
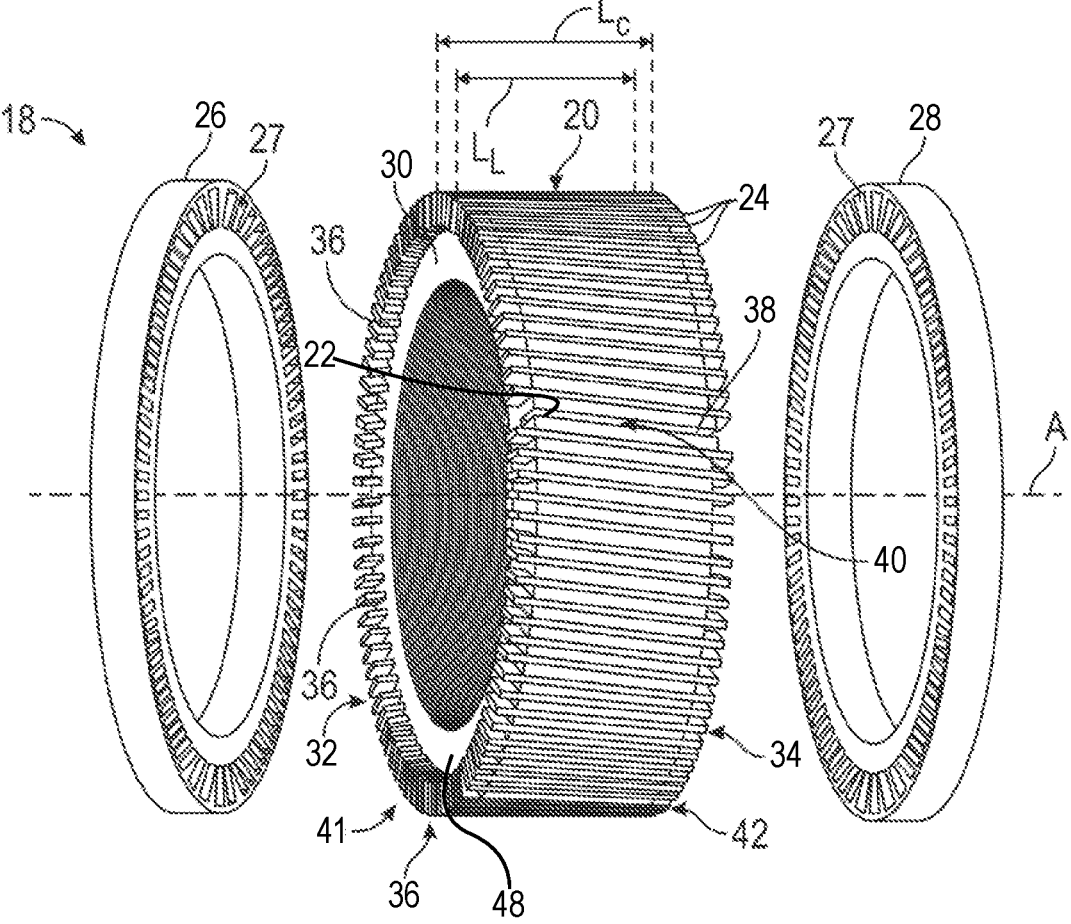
FIG. 2 is a schematic exploded view illustrating the induction rotor assembly shown in FIG. 1, where the induction rotor assembly includes a plurality of conductor bars, in accordance with the present disclosure.

FIG. 2 illustrates a schematic exploded perspective view of the induction rotor assembly 18. The induction rotor assembly 18 includes a laminated stack 20, a plurality of foils 22, a plurality of conductor bars 24, a first end ring 26, and a second end ring 28.

The laminated stack 20 includes a body 30 having a first end 32 and an opposing second end 34 to define a longitudinal axis A. The body 30 is formed from a plurality of laminated steel sheets stacked in an axial direction. The body 30 may be steel or steel alloy. The body 30 has an outer circumferential surface 36 extending from the first end 32 to the second end 34 coaxial with the longitudinal axis A.

As shown in FIG. 2, the outer circumferential surface 36 has a plurality of longitudinal walls 38 defining a plurality of open longitudinal grooves 40 formed therethrough from the first end 32 to the second end 34. The longitudinal grooves 40 may be slightly skewed relative to longitudinal axis A along a length LL of the laminated stack 20. Additionally, the longitudinal grooves 40 may be parallel to longitudinal axis A.

Figure 3:
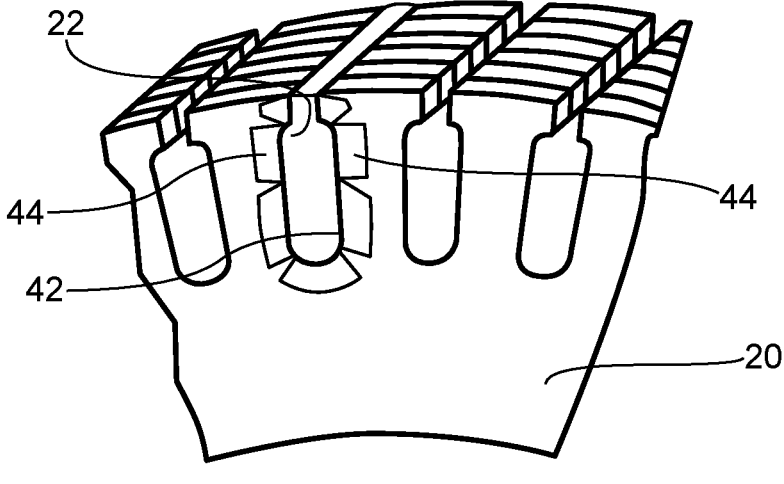
FIG. 3 is a perspective view of a laminated stack of the induction rotor shown in FIG. 2, with copper graphene foils disposed in grooves of the laminated stack, in accordance with the present disclosure.

FIG. 3 illustrates a plurality of foils 22 disposed in the plurality of grooves 40 of the laminated stack 20. The plurality of foils 22 is formed of a copper-graphene composite and may include up to 20% volume graphene, for example. The copper-graphene composite provides an improved mechanical and electrical performance within the induction rotor assembly 18. Additionally, using foils 22 including copper or a copper graphene composite improves current flow since copper has 64% higher electrical conductivity than aluminum, which increased the efficiency of utilizing the skin effect at higher frequencies. Moreover, using copper graphene foils 22 adjacent to the grooves 40 may eliminate welding and inner laminar shorting occurring during casting of the induction rotor assembly 18 by aluminum molten material between laminations in the induction rotor assembly 18 without copper graphene foil 22 in the grooves 40.

Each of the plurality of foils 22 is formed or folded into each of the grooves 40 so that the foils 22 contact and conform with the surface geometry of each groove 40. In some instances, an adhesive may be disposed on at least one side of the foils 22 (e.g., on a side adjacent to the laminated stack 20 and a surface of the grooves 40. In an example, each of the plurality of foils 22 may be between 20 and 30 micrometers (μm) thick and 60 millimeters in length (e.g., an axial length of the grooves 40). Further, at least one side of each foil 22 (e.g., a side configured to contact liquid aluminum and/or the conductor bars 24 may include a rough or serrated surface, which facilitates improved bonding between the foils 22 and the conductor bars 24. The rough or serrated surface may remove melt surface oxide for better mold filling. In some instances, the rough or serrated surface may be formed using a coating on the foil 22, where the coating causes the rough surface. An amount of roughness of the rough or serrated surface may be determined at least partially based on aluminum melt surface tension. In an example, the coating on the foil 22 includes a copper silver (Cu—Ag) or copper nickel (Cu—Ni)-based coating, and cold-spray or physical vapor deposition (PVD) methods may be used to apply the coating. When the coating includes copper silver (Cu—Ag), the copper silver (Cu—Ag) can be between 25 and 35 weight percentage (wt. %). Additionally, at least some of the longitudinal walls 38 may include surface roughness, which is replicated on the foils 22 prior to the casting process.

As shown in FIG. 3, and in some instances, the plurality of foils 22 may protrude from the grooves 40 in one or both directions (e.g., parallel to longitudinal axis A). When the plurality of foils 22 protrudes from the grooves 40, the foils 22 can facilitate better bonding to other components during subsequent casting. In an example, the protruding foils 22 may extend from the grooves 40 in a direction proximate an ingate. The protruding foils 22 may extend from the grooves aligned with the longitudinal axis A and may be bent (e.g., 90°) at an edge 42 of the groove so that a protruding portion 44 contacts the body 30 and is perpendicular to the grooves 40 and longitudinal axis A. In some instances, the protruding portion 44 may be welded to protruding portions 44 of the other foils 22 disposed in other grooves 40. During high pressure die casting of the induction rotor assembly 18, bending the protruding portion 44 (near an ingate side) can keep the foils 22 from being displaced during the casting process.

Figure 4:
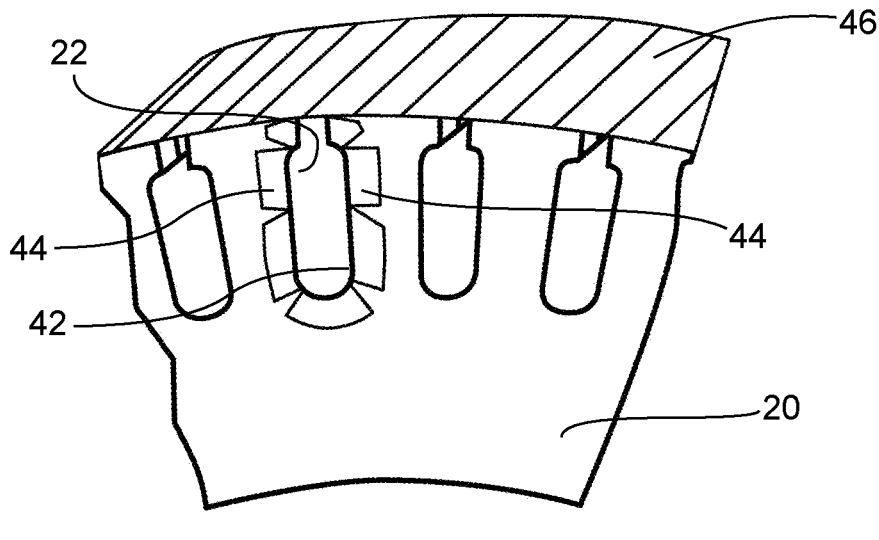
FIG. 4 is a perspective view of the laminated stack of the induction rotor shown in FIGS. 2 and 3, with a ring-shaped feature circumferentially extending around the laminated stack, in accordance with the present disclosure.

Referring to FIG. 4, a ring-shaped feature 46 is shown affixed to an outer circumferential surface 36 of the laminated stack 20. The ring-shaped fixture 46 extends around at least a portion of the outer circumferential surface 36 and may be in the form of a cylinder and/or ring. The ring-shaped feature 46 is configured to hold the foils 22 in the grooves 40 after placement of the foils 22 and during casting of the conductor bars 24. The ring-shaped fixture 46 may be removed after casting of the conductor bars 24. The ring-shaped fixture 46 may include a material (e.g., steel) with a melting temperature greater than that of a material of the conductor bars 24 (e.g., aluminum).

Referring again to FIG. 2, each of the plurality of conductor bars 24 is disposed within each of the longitudinal grooves 40. Each of the plurality of foils 22 is disposed between each one of the plurality of conductor bars 24 and each one of the plurality of grooves 40. For convenience, FIG. 2 illustrates one conductor bar 24 removed to show one longitudinal groove 38 defined by the longitudinal walls 38. The conductor bars 24 carry induced current in the induction rotor assembly 18, which interacts with the magnetic field produced by the stator 16 and produces torque. Each of the plurality of conductor bars 24 has a first conductor end 41. The first conductor end 41 extends axially beyond the first end 32 of the laminated stack 20. Each of the plurality of conductor bars 24 also has a second conductor end 42. The second conductor end 42 extends axially beyond the second end 34 of the laminated stack 20. Each of the conductor bars 24 has a conductor length $L_C$ extending parallel to the longitudinal axis A. The conductor bars 24 may be manufactured from aluminum or copper.

As illustrated in FIG. 2, the first end ring 26 abuts and is fixed to each of the first conductor ends 41 of each of the plurality of conductor bars 24 at the first end 32 of the laminated stack 20. The second end ring 28 abuts and is fixed to each of the second conductor ends 42 of each of the plurality of conductor bars 24 at the second end 34 of the laminated stack 20. The first end ring 26 at least partially surrounds and electrically couples the first end 32 to the conductor bars 24. The second end ring 28 at least partially surrounds and electrically couples the second end 34 to the conductor bars 24. The first end ring 26 and the second end ring 28 are preferably cast in place from aluminum or a cast aluminum alloy. However, it should be appreciated that the first end ring 26 and the second end ring 28 may be cast in place from other conductive materials.

Figure 5:
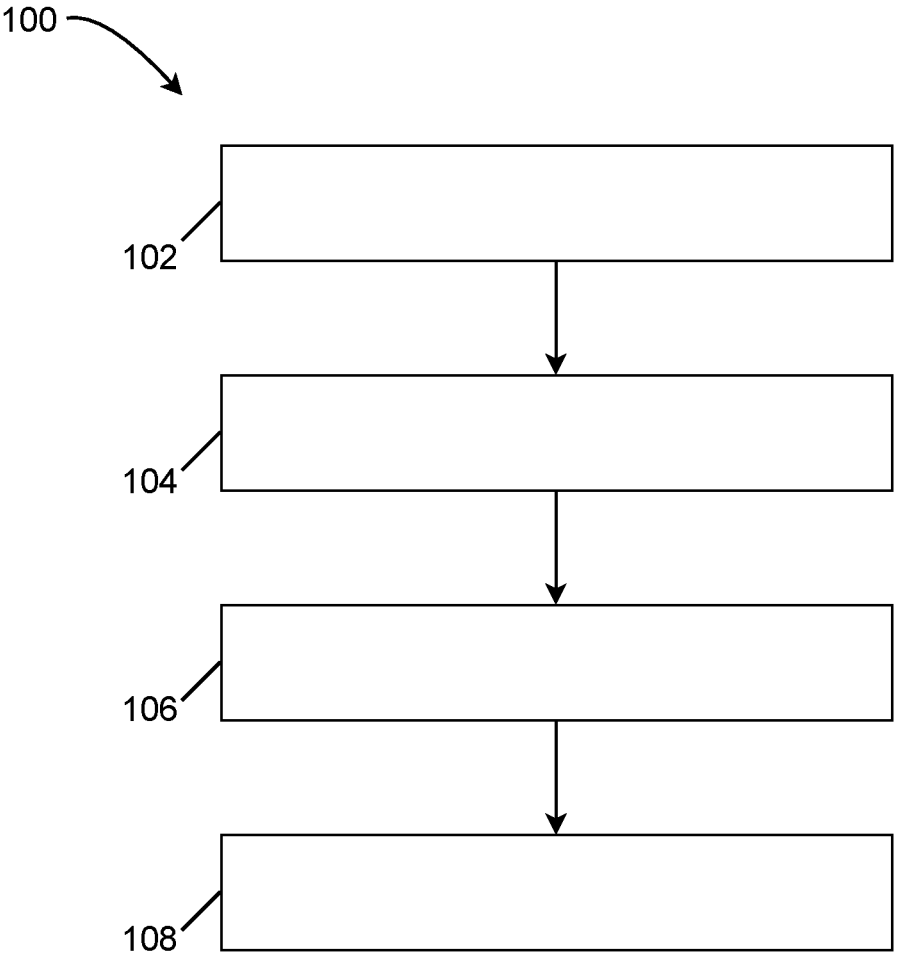
FIG. 5 is a flowchart illustrating a method of manufacturing the induction rotor assembly with graphene copper foils shown in FIG. 3, in accordance with the present disclosure.

Referring now to FIG. 5, a flowchart illustrating a method 100 for manufacturing an induction rotor assembly 18 having graphene-copper foils is presented, in accordance with the present disclosure.

The method starts at block 102. Block 102 depicts laminating a plurality of steel sheets to define the laminated stack 20. The laminated stack 20 includes the first end 32 and the second end 34. The second end 34 is axially spaced from the first end 32 along the longitudinal axis A. The steel sheets are laminated together so that slots in each of the steel sheets cooperate to define the grooves 40 extending along the longitudinal axis A. The grooves 40 are angularly spaced about and equidistant from the longitudinal axis A. The method then moves to block 104.

Block 104 depicts placing a plurality of foils 22 in the plurality of grooves 40. The plurality of foils 22 can be formed and placed into the grooves 40 using a variety of methods. In examples, the foils 22 may be formed using 3D additive manufacturing, metal printing, a spray coating, and may include other highly conductive materials. Additionally, the foils 22 may include a high conductive layer surface finish using the previously listed forming methods for better bonding to the conductor bars 24.

In an example, the foils 22 may be preformed and bent, folded, or otherwise shaped in conformity with a geometry of each groove 40. The preformed foils 22 are then placed into the grooves 40. Placing the foils 22, in this example, includes using an automated process (e.g., a robotic arm) to place and/or shape the foils 22. In some instances, placing the plurality of foils 22 may include placing multiple foils 22 into each groove 40. Additionally, placing the plurality of foils 22 may include pre-heating the foils 22 and/or the laminated stack 20 (e.g., to 150-350° C.) prior to being positioned within each groove 40 to assist with metallurgical bonding between the foils 22 and the conductor bars 24. Placing the plurality of foils 22 may include forming an intermetallic phase at an interface between each foil 22 and the conductor bars 24. The intermetallic phase may be disposed on an entire surface of the foils 22 or dispersed on the surface of the foils 22.

In another example, placing the foils 22 includes placing and shaping the foils 22 in situ. Placing and shaping the foils 22 in situ can include placing the foils 22 within each groove 40 and then shaping each foil 22 to conform to the geometry of each individual groove 40. For example, the foils 22 may be folded into each groove 40 and then pushed and conformed with the profile of the groove 40 using thin needles. The foils 22 may have a thickness between 20 and 30 micrometers (μm).

In some instances, placing the foils 22 can include placing a ring-shaped feature 46 around a circumference of the laminated stack 20 prior to a casting of the conductor bars 24. The ring-shaped feature 46 functions to hold the foils 22 in place as the casting material (e.g., aluminum) flows through the grooves 40. The ring-shaped feature 46 is generally removed with minor machining subsequent to casting the conductor bars 24.

Additionally, placing the foils 22 in each of the grooves 40 may include bending a protruding portion 44 of the foils 22. In this instance, bending the protruding portion 44 includes bending the protruding portion 44 over an edge of the groove 40 so that the bent protruding portion 44 substantially contacts and is flush with an axial surface 48 of the laminated stack 20. The bent protruding portion 44 can be bent using an automated process (e.g., a robotic arm). Additionally, the bent protruding portion 44 can be welded to adjacent bent protruding portions 44 of adjacent foils 22. The method 100 then moves to block 106.

Block 106 depicts forming a conductor bar 24 in each of the plurality of grooves 40. Each one of the conductor bars 24 is formed on the foils 22 in each groove 40, and the foils 22 are disposed between each conductor bar 24 and the laminated stack 20. The conductor bars 24 are formed to include a conductor length $L_C$ longer than the laminated stack length LL so that the first conductor end 41 and the second conductor end 42 extend outward beyond the first end 32 and the second end 34 of the laminated stack 20, respectively. In some instances, the conductor bars 24 are pre-formed and placed into each groove 40. In other instances, the conductor bars 24 are cast in situ in each groove 40. The conductor bars 24 are formed and/or positioned so that the first conductor end 41 and the second conductor end 42 of each of the plurality of conductor bars 24 extend axially outward beyond the first end 32 and the second end 34 of the laminated stack 20, respectively. The method 100 then moves to block 108.

Block 108 depicts casting the first end ring 26 in place around the first conductor end 41 and casting the second end ring 28 in place around the second conductor end 42. Casting the first end ring 26 and the second end ring 28 in place can include placing the laminated stack 20, having the plurality of conductor bars 24 positioned therein, into a form. The form defines the first end ring 26 and/or the second end ring 28 and can be any suitable shape and size for casting the first end ring 26 and/or the second end ring 28. The first end ring 26 is cast in place around the first conductor end 41 on each of the conductor bars 24. The first end ring 26 is cast to at least partially surround and electrically connect the first conductor end 41 of each of the plurality of conductor bars 24 with the first end ring 26. Additionally, the second end ring 28 is cast in place around the second conductor end 42 on each of the conductor bars 24. The second end ring 28 is cast to at least partially surround and electrically connect the second conductor end 42 of each of the plurality of conductor bars 24 with the second end ring 28.

Casting the first end ring 26 and the second end ring 28 includes injecting molten material into the form and around the first conductor end 41 and the second conductor end 42 of each conductor bar 24. The first end ring 26 and the second end ring 28 is preferably cast from aluminum or an aluminum alloy. It will be appreciated that the first end ring 26 and the second end ring 28 may be cast using some other conductive material. Casting the first end ring 26 and/or the second end ring 28 includes flowing the molten material in and around the first conductor end 41 and the second conductor end 42 of each conductor bar 24 upon solidification. Casting processes that may be used to cast the first end ring 26 and the second end ring 28 include a high pressure die casting process, a low pressure die casting process, a sand-casting process, or a squeeze casting process.

Casting the first end ring 26 and the second end ring 28 may further include compressing the molten material as the molten material solidifies. Compressing the molten material as the molten material solidifies during the casting process reduces porosity on the finished cast in place product and improves mechanical properties of the finished product.

Additionally, casting the first end ring 26 and the second end ring 28 may further include vibrating each of the conductor bars 24 at an ultrasonic frequency for a predefined period of time during solidification of the molten material of the cast in place first end ring 26 and/or the second end ring 28. Preferably, the ultrasonic frequency is 20 kHz or greater. The conductor bars 24 may be vibrated for a time less than 20 seconds. Vibrating the conductor bars 24 during solidification of the molten material during the casting process can break up aluminum oxides disposed on the outer surface of the first conductor end 41 and/or the second conductor end 42 of the conductor bars 24. Vibrating the conductor bars 24 also improves wetting between the molten material and the conductor bars 24. Method 100 then ends.

The present disclosure has many advantages and benefits over prior art induction rotor assemblies. For example, using copper and/or copper graphene foils 22 between the laminated stack 20 and the conductor bars 24 improves current flow near an outer surface of the conductor bars 24 since copper has a 64% higher electrical conductivity than aluminum, which increases the skin effect at higher frequencies. Additionally, using copper graphene composite foils 22 adjacent to the grooves 40 eliminates welding and inner laminar shorting occurring during casting of the induction rotor assembly 18 by the aluminum molten material, which occurs between lamination layers of the laminated stack 20 without the foils 22. Moreover, the induction rotor assembly 18 is more efficient with higher rotor resistance during startup and higher starting torque and with lower resistance during normal operation so that machine efficiency can be higher due to a lower rotor loss. Thus, the induction rotor assembly 18 disclosed herein increases rotor resistance during startup due to the skin effect (e.g., higher rotor current frequency) and reduces the resistance during normal operation (e.g., rotor current frequency is very low) due to higher conductivity of the copper graphene foils 22, which improves overall efficiency of the induction rotor assembly 18 and vehicle motor 12.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. An induction rotor assembly, comprising:
   a laminated stack including a body having a first end and an opposing second end arranged along a longitudinal axis, wherein the body has an outer circumferential surface extending from the first end to the second end along the longitudinal axis, wherein the outer circumferential surface has a plurality of grooves extending from the first end to the second end;

a plurality of foils, wherein each one of the plurality of foils is disposed within one of the grooves;

a plurality of conductor bars, wherein each of the plurality of conductor bars is disposed within each of the grooves, wherein each one of the plurality of foils is disposed between each one of the plurality of conductor bars and each one of the grooves, wherein each of the plurality of conductor bars includes a first conductor end extending axially beyond the first end of the laminated stack and a second conductor end extending axially beyond the second end of the laminated stack, and wherein multiple foil layers are disposed between each groove and each conductor bar;

a first end ring mating with a surface of each first conductor end to interlock each of the plurality of conductor bars to the first end ring; and a second end ring mating with a surface of each second conductor end to interlock each of the plurality of conductor bars to the second end ring, and wherein the plurality of conductor bars extend between the first end ring and the second end ring.

2. The induction rotor assembly of claim 1, wherein the body includes a plurality of laminated steel sheets.

3. The induction rotor assembly of claim 1, wherein the plurality of foils is pure copper or copper graphene composite.

4. The induction rotor assembly of claim 3, wherein the plurality of foils is less than or equal to 20% graphene by volume.

5. The induction rotor assembly of claim 4, wherein the first end ring and the second end ring include and are formed from aluminum.

6. The induction rotor assembly of claim 1, wherein the plurality of foils includes an adhesive on one side of each foil.

7. The induction rotor assembly of claim 1, wherein each foil of the plurality of foils is between 20 and 30 micrometers thick.

8. The induction rotor assembly of claim 1, wherein each foil of the plurality of foils protrudes from the grooves.

9. The induction rotor assembly of claim 1, wherein each foil of the plurality of foils includes a coating at least partially having a rough surface.

10. The induction rotor assembly of claim 1, wherein the plurality of conductor bars is formed from at least one of copper or aluminum.

11. The induction rotor assembly of claim 1, wherein the first end ring and the second end ring are each cast in place over the first conductor end and a second conductor end, respectively, of each of the plurality of conductor bars.

12. A vehicle motor, comprising:

a stator; and an induction rotor assembly configured to rotate due to a rotating magnetic field created by the stator, wherein the induction rotor assembly includes a laminated stack including a body having a first end and an opposing second end arranged along a longitudinal axis, the body having an outer circumferential surface extending from the first end to the second end along the longitudinal axis, the outer circumferential surface having a plurality of grooves extending from the first end to the second end;

a plurality of foils, wherein each one of the plurality of foils is disposed within one of the grooves;

a plurality of conductor bars, wherein each of the plurality of conductor bars is disposed within each of the grooves, wherein each one of the plurality of foils is disposed between each one of the plurality of conductor bars and each one of the grooves, wherein each of the plurality of conductor bars includes a first conductor end extending axially beyond the first end of the laminated stack and a second conductor end extending axially beyond the second end of the laminated stack, and wherein multiple foil layers are disposed between each groove and each conductor bar;

a first end ring mating with a surface of each first conductor end to interlock each of the plurality of conductor bars to the first end ring; and a second end ring mating with a surface of each second conductor end to interlock each of the plurality of conductor bars to the second end ring, and wherein the plurality of conductor bars extends between the first end ring and the second end ring.

13. The vehicle motor of claim 12, wherein the plurality of foils is pure copper or copper-graphene composite.

14. The vehicle motor of claim 12, wherein each foil of the plurality of foils is between 20 and 30 micrometers thick.

15. The vehicle motor of claim 12, wherein the plurality of conductor bars is formed from at least one of copper or aluminum.

16. The vehicle motor of claim 12, wherein each foil of the plurality of foils protrudes from the grooves.

17. A method of manufacturing an induction rotor assembly, comprising:

laminating a plurality of steel sheets to form a laminated stack having a first end and an opposing second end axially spaced along a longitudinal axis, wherein a plurality of grooves are disposed on an outer circumferential surface of the laminated stack and extend from the first end to the second end;

placing a plurality of foils in the plurality of grooves;

forming a conductor bar in each of the grooves such that each one of the plurality of foils is disposed between each conductor bar and the laminated stack, wherein a first conductor end extends axially beyond the first end of the laminated stack, and wherein multiple foil layers are disposed between each groove and each conductor bar; and casting a first end ring in place around each first conductor end of each of the conductor bars and a second end ring in place around each second conductor end of each of the conductor bars to at least partially surround and electrically connect the first conductor end and the second conductor end of each of the plurality of conductor bars.

18. The method of claim 17, wherein the plurality of foils includes pure copper or copper-graphene composite.

19. The method of claim 17, wherein placing the plurality of foils in the plurality of grooves includes placing preformed foils.

20. The method of claim 17, wherein placing the plurality of foils in the plurality of grooves includes placing the foils in situ.

* * * * *